Patented Feb. 7, 1939

2,146,320

UNITED STATES PATENT OFFICE 2,146,320

WELDING WIRE

Francis M. Walters, Jr., Youngstown, Ohio, assignor to The Youngstown Sheet and Tube Company, Youngstown, Ohio, a corporation of Ohio No Drawing. Application February 12, 1937, Serial No. 125,424

4 Claims. (Cl. 219—8)

This invention relates to welding wire of novel composition having certain properties and characteristics rendering it especially adapted for electric arc welding.

In modern automatic welding machines in which the welding wire is mechanically fed to the work considerable difficulty has been encountered in properly controlling the welding current because of the extremely wide changes in the specific electrical resistance at different temperatures of the welding wires commonly employed. Thus at the start of the welding operation when the welding wire is approximately at room temperature, the specific resistance of such wires is relatively low but increases very rapidly as the wire is heated up and thus at about 400° C. may be nearly three times the resistance at room temperature. As the wire of course carries the welding current this increase in resistance necessarily results in a marked diminution of the current at any given setting of the current supplying generator controls, so that in order to maintain the current at the proper value for making satisfactory welds considerable adjustment of the generator controls to thereby regulate the generator output in correspondence with the variations in the welding wire temperature and hence its resistance is required. Moreover, as the generator response to current modifying adjustments is relatively slow compared with the resistance changes in the wire, it is very difficult and often almost impossible to attain uniformity in the weld, at least until the wire has attained its maximum temperature.

However, the welding wire of my invention largely obviates this difficulty since, among its other properties, it maintains its electrical resistance fairly constant and within relatively narrow limits during temperature fluctuations as compared with the welding wires heretofore commonly used, its resistance increasing only comparatively slightly as the wire is heated.

A principal object of the invention therefore is the provision of welding wire of novel composition having a low temperature coefficient of electrical resistance and which therefore does not materially diminish the welding current flowing therethrough as the temperature of the wire increases.

Another object is the provision of welding wire having low thermal conductivity whereby the making of a weld is facilitated and the cooling of the weld metal deposited in the weld is retarded, resulting in a stronger bonding between the weld metal and the pieces joined thereby.

A further object of the invention is to provide ferrous alloy welding wire of novel composition which possesses high corrosion resistant qualities and great mechanical strength in addition to the properties to which reference has already been made, and which is particularly adapted for welding ferrous articles including those made of that class of alloy steels commonly known as "copper-nickel" steels.

Other objects, purposes and advantages of the invention will more fully appear from the following description of welding wire produced in accordance therewith in which reference will be made to certain preferred analyses particularly adapted for use in welding wire for electric arc welding, and it will be understood that while the term "welding wire" is used herein for convenience, it is thereby intended to include all articles of any desired shape designed for use in supplying weld metal in welding operations, such, for example, as the heavier welding "rods" which are perhaps more generally used in autogenous welding, although, of course, the advantage of the low temperature coefficient of electrical resistance is not there realized as it is in electric arc welding.

Thus for the manufacture of my welding wire I prefer to use a composition or alloy containing the following ingredients within the range stated:

| | Per cent |
|---|---|
| Carbon | 0.050 to 0.100 |
| Manganese | 0.150 to 0.700 |
| Silicon | 0.004 to 0.250 |
| Phosphorus | 0.000 to 0.055 |
| Sulphur | 0.000 to 0.040 |
| Copper | 0.500 to 1.500 |
| Nickel | 0.500 to 2.000 |
| Iron | 98.796 to 95.355 |
| | 100.000 to 100.000 |

Of course certain other elements may be present in minute amounts but are not mentioned in the foregoing analysis range because for best results they are present, if at all, in such small quantities as not materially to affect any of the properties or characteristics of the wire or the weld into which it enters. The alloy may be produced in accordance with usual processes in the steel making art and thus in an electric furnace, open hearth furnace, Bessemer converter or any other suitable apparatus, the customary considerations and precautions being observed for insuring the presence of the several ingredients in the desired proportions. However, the specific method of producing the alloy and, when it has been produced, of reducing it to suitable form for use as welding wire are no part of the invention and may be carried out in any convenient or desired way.

Within the foregoing analysis range it will be apparent that different compositions may be made, varying in the exact proportions of one or more of the several ingredients, and by way of example the following two specific analyses within the said range have been found eminently satisfactory for welding wire for electric arc welding:

|  | A | B |
|---|---|---|
|  | Percent | Percent |
| Carbon | 0.080 | 0.080 |
| Manganese | 0.440 | 0.450 |
| Silicon | 0.005 | 0.150 |
| Phosphorus | 0.055 | 0.016 |
| Sulphur | 0.018 | 0.020 |
| Copper | 1.020 | 1.050 |
| Nickel | 1.990 | 1.900 |
| Iron, including impurities | 96.392 | 96.334 |
|  | 100.000 | 100.000 |

Welding wires of these two analyses have been tested and the specific electrical resistance S of each both at 24° C. and at 400° C. computed with the aid of the formula $$S = \frac{RA}{L}$$

from the observed resistance R of a wire of length L and cross section A, and upon comparing the results with the specific resistance of electrolytic iron and of an ordinary welding wire computed from similar observations at like temperatures it was found the increased resistance of my welding wire under the influence of heat is only approximately one-third that of electrolytic iron and about one-half that of the ordinary welding wire tested. Thus while the resistance of electrolytic iron containing about 0.0015% of carbon increased three hundred per cent, and that of the ordinary welding wire close to two hundred per cent on heating from 24° C. to 400° C., that of the welding wire of analysis A increased only a little over 100% while the analysis B wire showed an increase of only 91% under the same conditions of test.

Additionally, in thermal conductivity tests my welding wire was found to be distinctly lower than pure iron in approximately the ratio of 10:18 so that heat travels through it only a little over half as rapidly, resulting in a much slower rate of temperature increase in my welding wire than in pure iron wire or ordinary welding wire.

Since in welding, the greatest heat is generated at the weld, that is, in the vicinity of the end of the welding wire, and the wire is substantially continuously fed toward the weld as it is melted and deposited in the seam, the travel of the wire is in opposition to the principal direction of heat conduction therein and when the thermal conductivity of the wire is kept low, the average temperature of the wire between the arc and its point of contact with the welding current conductors is considerably less than in wire with higher thermal conductivity.

Consequently, my welding wire can be used for welding without too rapid increase in electrical resistance in that part of the wire forming a portion of the welding circuit, with consequent maintenance of the current at substantially constant value both because of the low temperature coefficient of electrical conductivity of the wire and its low thermal conductivity.

Moreover the heat imparted to the weld metal deposited in the seam is dissipated to the surrounding air and the adjacent portions of the work less rapidly than when weld metal of high thermal conductivity is used, and the consequent more gradual cooling of the weld metal and adjacent parts better insures the retention of the normal physical properties of the metal than when a more highly heat conductive metal is used and tends to minimize brittleness in the weld.

It will of course be understood that the specific analyses to which reference has been made are for purposes of illustration only and that many other different alloys within the range set forth herein may be made and utilized for welding wires within the spirit and scope of the invention as defined in the appended claims.

Having thus described my invention, I claim and desire to protect by Letters Patent of the United States:

1. A welding wire containing carbon 0.07% to 0.10%, manganese 0.15% to 0.70%, silicon 0.004% to 0.25%, phosphorus 0.016% to 0.055%, sulphur 0.018% to 0.04%, copper 0.80% to 1.20%, nickel 1.70% to 2.00% and substantially pure iron to make 100%.

2. A welding wire containing carbon about 0.08%, manganese about 0.44% to about 0.45%, silicon about 0.005% to about 0.150%, phosphorus about 0.016% to about 0.055%, sulphur about 0.018% to about 0.020%, copper about 1.02% to about 1.05%, nickel about 1.90% to about 1.99%, and substantially pure iron to make 100%.

3. A welding wire containing substantially in amounts as follows: carbon 0.080%, manganese 0.440%, silicon 0.005%, phosphorus 0.055%, sulphur 0.018%, copper 1.020%, and nickel 1.990%, with the remainder substantially pure iron.

4. A welding wire containing substantially in amounts as follows: carbon 0.080%, manganese 0.450%, silicon 0.150%, phosphorus 0.016%, sulphur 0.020%, copper 1.050%, and nickel 1.900%, with the remainder substantially pure iron.

FRANCIS M. WALTERS, Jr.